Sept. 16, 1958  F. RIEMERSCHMID  2,852,317
TRACKLAYING UNDERCARRIAGE FOR AUTOMOTIVE VEHICLES
Filed Jan. 10, 1956  2 Sheets-Sheet 1

INVENTOR:
Fritz Riemerschmid
BY
Richards Geier
ATTORNEYS

Sept. 16, 1958 F. RIEMERSCHMID 2,852,317
TRACKLAYING UNDERCARRIAGE FOR AUTOMOTIVE VEHICLES
Filed Jan. 10, 1956 2 Sheets-Sheet 2

INVENTOR:
Fritz Riemerschmid
BY
Richards & Geier
ATTORNEYS

United States Patent Office 2,852,317
Patented Sept. 16, 1958

2,852,317
TRACKLAYING UNDERCARRIAGE FOR AUTOMOTIVE VEHICLES

Fritz Riemerschmid, Starnberg, Germany

Application January 10, 1956, Serial No. 558,371

Claims priority, application Germany January 13, 1955

10 Claims. (Cl. 305—4)

The present invention relates to tracklaying undercarriage mechanism for automotive vehicles of the type enabling such vehicles to travel over pathless terrain as well as over snow. Numerous constructions of the tracklaying or crawler type have heretofore been proposed, but in all of these known cases special-type vehicles are involved, the construction of which either prohibits or renders extremely difficult the use of the vehicle under normal road and travel conditions.

Accordingly it is one of the main objects of the present invention to provide a crawler-type tracklaying undercarriage for automotive vehicles which, while being particularly suitable for travel over snow-covered terrain, can be quickly and easily substituted for the standard wheels of the vehicle. It is another object of the invention to provide a construction of the type indicated in which, except for the removal of the said standard wheels from the vehicle, requires no structural changes to be made in a given vehicle. Thus, the invention renders it possible, whenever it may be desired, to provide an automotive vehicle of any given type with a tracklaying mechanism which takes the place of the standard wheels on which the said vehicle normally travels.

The tracklaying undercarriage of the present invention is characterized by the provision of two independent unitary skid-shaped tracklaying assemblies which extend at least over the entire length of the vehicle, which have brackets thereon serving to attach the said assemblies to the vehicle, and in which both the driving and the driven strands of the track chains extend below the wheel axles of the vehicle to which the assemblies are fitted.

To provide for satisfactory travel of the vehicle on snow-covered terrain it is necessary that the ground pressure does not exceed a value of about 1.4 pounds per square inch (100 grams per square centimetre). It is, therefore, convenient to provide for the effective maximum area of contact between the said skid-shaped tracklaying assemblies and the ground to amount to at least 60% of the area covered by the vehicle when fitted with its wheels.

Other objects, features and advantages of the present invention will be readily apparent from the following detailed description of a preferred embodiment thereof taken in conjunction with the accompanying drawings, in which.

As will be seen in Fig. 1, the invention will be described in connection with a well-known type of automotive vehicle, namely, a vehicle known under the trade name "Jeep"; it should, however, be expressly understood that the invention is in no way limited to its application to vehicles of the aforementioned type but that it may be applied in a similar manner, also according to the invention, to automotive vehicles of any other type.

Figure 1:
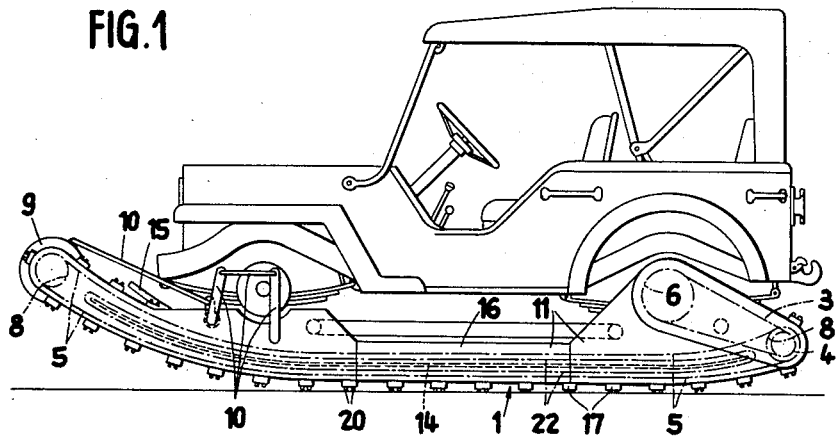
Fig. 1 is a side-elevational view of an automotive vehicle fitted with the tracklaying mechanism of the invention.
Figure 2:
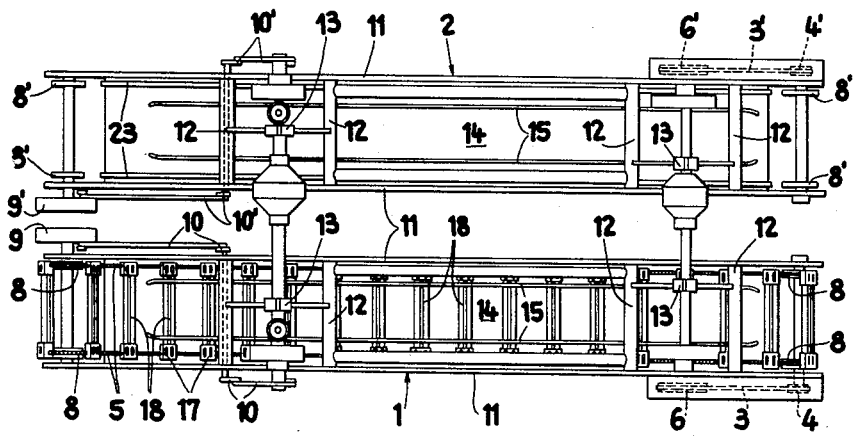
Fig. 2 is a plan view of the axles of the vehicle with the track chain assemblies in position.

Referring now more in particular to the drawings, there is shown in Figs. 1 and 2 an automotive vehicle of the type named in which the traveling wheels have been replaced by two track chain assemblies 1 and 2, of which one is mounted on either side of the said vehicle. Each track chain is arranged to be driven, with a transmission ratio that may be selected to suit requirements, by one roller chain 3 or 3' which connects the drive sprocket 4 or 4' for the track chain 5 or 5' with a sprocket 6 or 6' which latter is mounted on the wheel attachment bolts normally provided on the brake drums of the drive wheels of the vehicle. Conveniently the mounting flange of the sprocket 6 or 6' serving to attach the respective sprocket to said wheel attachment bolts is of a construction such that it may be universally applicable in connection with the brake drums of the various types and models of automotive vehicles.

The track chain assemblies 1 and 2 are constructed in such a manner that each assembly presents on its under side a skid surface 1a with which the vehicle supports itself, the track chain being moved along said skid surface and being provided with interspaces providing for a proper supporting action.

The vehicle fitted with the track chain assemblies of the invention is adapted to be steered, also according to the invention, by providing for either the left-hand or the right-hand track chain to be decelerated by means of the vehicle steering gear which in itself remains unchanged structurally. For this purpose there is arranged, for example, on the shafts of the front return sprockets 8 and 8' of each track chain a drum brake 9 or 9', respectively, which is adapted to be operated, for example, by an adjustable mechanical linkage 10 or 10', the arrangement being such that any angular movement of the vehicle front wheel hubs resulting from an angular movement of the steering wheel is transmitted either through the existing front wheel stub axle or through an additional cylinder mounted on the front wheel hub to the said mechanical linkage 10 or 10' so that one or the other of two linkages operates the actuating lever of either the drum brake 9 or the drum brake 9'.

It is also possible to steer the vehicle fitted with the tracklaying mechanism by using the existing brakes on those wheels of the vehicle of which the brake drums serve to drive the track chains, e. g., the rear wheel brakes, to individually brake the track chains as required. For this purpose it is necessary that the left-hand brake and the right-hand brake should be separately and independently operable. It is possible by providing additional hydraulic control means to arrange for the left-hand vehicle brake to be operated upon the steering wheel being turned counterclockwise and for the right-hand brake to be operated upon the steering wheel being turned clockwise. With the steering wheel in its straight ahead position, the existing brake system may be operated by means of the brake pedal to operate both brakes simultaneously, this making it possible to use the brake system during operation of the vehicle fitted with the tracklaying mechanism.

Each of the track chain assemblies 1 and 2 comprises one self-sustaining frame constituted by longitudinally extending plates 11 which are suitably spaced apart, for example by transverse tubular members 12, on which frames the vehicle axles are supported and to which the axles are secured by means of suitable straps 13. Within the said frames the track chains are exclusively supported by the drive and return sprockets 8 and 8', respectively, and by additional longitudinally extending guide rails; in other words, no supporting rollers of heretofore known construction are used to support the vehicle from the track chains, this resulting in a considerable simplification of the entire construction. Arranged above each of the longitudinally extending skid plates 14 of the two track chain assemblies 1 and 2 is a pair of rails 15 adapted to hold down the upper reach of the associated track chain.

The track chain assemblies 1 and 2 may be adapted to match the different wheel bases of different types of vehicle, for example by suitably changing the length of the central longitudinal plate 16 of the frame for the track chain assemblies, whereas the shape and the dimensions of all of the remaining parts of the frames may be left unchanged.

Further advantages may be secured by providing for a three-point support of the vehicle on the track chain assemblies, the said assemblies being preferably attached to the rear axle of the vehicle by means of clamps, quick-action couplings and the like, whereas the front axle of the vehicle is supported by forked members which are movable in the direction of travel, one each of these forked members being centrally located on each frame of the track chain assemblies, and the front axle being suitably locked against disengagement and lateral displacement.

Figures 3, 4:
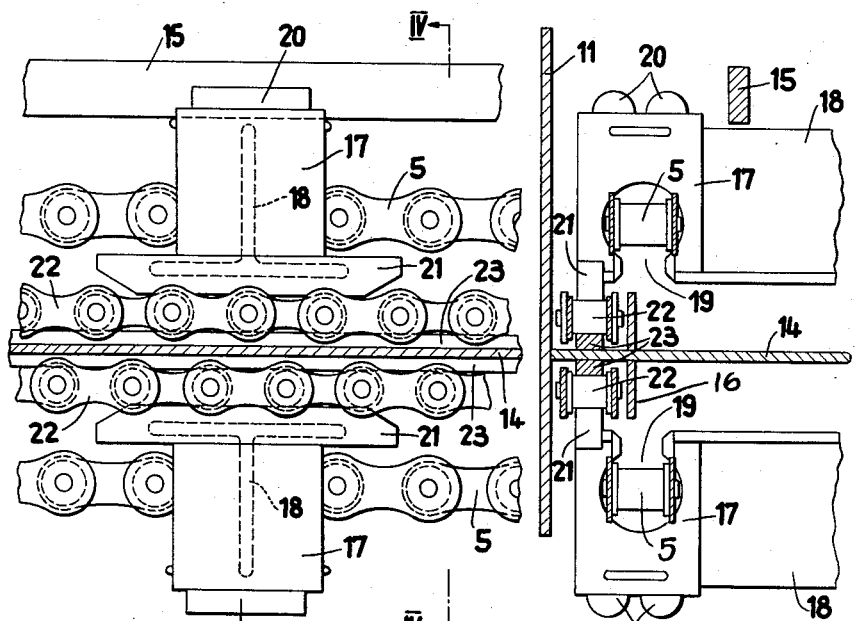
Fig. 3 is a fragmentary side-elevational view, on an enlarged scale, showing part of one of the track chain assemblies.
Fig. 4 is cross-sectional view taken along the line IV—IV in Fig. 3.

As will be seen in Fig. 4, the skid plate 14 of each track chain assembly has laterally welded thereto the plates 11 and 16, respectively, so that true hollow skids are formed. Attached to the roller chain 5, which is the driven member of the track chain, are cleats composed of mounting brackets 17 and transverse T-sections 18. The T-sections extending through the said mounting brackets 17 and welded thereto have inwardly flared openings 19 into which the roller chain 5 can be inserted in the direction of the axes of the rollers, whereupon the chain is rotated 90° to give it the position shown in Fig. 4, in which position the chain 5 is held against dropping out of the flared openings and serves positively to drive the cleats in the direction of chain travel. Furthermore, the mounting brackets 17 carry pegs 20 made of a suitable soft material, for example rubber, which pegs face away from the roller chain 5 and enable the track chains to run also on hard surfaces without excessive shocks and without producing excessive noise.

Welded to each end of each cleat is a supporting skid member 21 which bears on the rollers of a roller chain 22 serving as a roller guide or bearing for the track chain, the chain 22, in turn, bearing against an endless flange 23 extending on either side of the skid plate 14. Thus, the track chain 5 will run with very little friction on the roller chain 22 which latter acts like an endless roller bearing, traveling at one-half the rate of the track chain.

When the vehicle is traveling over snow-covered ground and similar terrain, the weight of the vehicle is supported mainly by the skid plates 14 of the track chain assemblies 1 and 2 rather than by the cleats 17, 18, the skid plates sliding over the supporting surface in the manner of ski runners, whereas the cleats serve to drive the vehicle forward.

The range of usefulness of vehicles adapted to be fitted with crawler-type undercarriages according to the invention can be considerably extended by providing for the track chain assemblies to be kept ready for use in a trailer towed by the vehicle in question. When the vehicle is to be operated on its normal wheels, the track chain assemblies may be taken along by loading them on a two-wheel trailer of known construction; in doing this, the two track chain assemblies are arranged on edge and in the direction of travel on the trailer and are interconnected by means of their mounting brackets. This method affords a possibility of loading and unloading the trailer even while carrying the track chain assemblies.

It may also be of advantage to provide for the said trailer to be towed as a sleigh behind the vehicle to which the crawler undercarriage has been fitted. For this purpose it is convenient to provide under the bottom of the trailer, i. e. below the trailer axle and within the space between the wheels, two skids which are located about 4 inches (10 cms.) above the ground, the result of this arrangement being that the trailer may be used as a load-carrying means during travel on both hard ground and soft snow.

Figure 5:
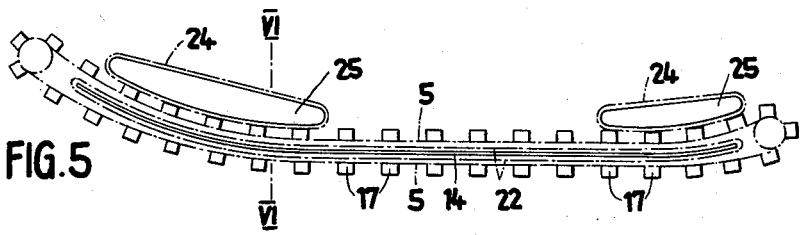
Fig. 5 is a schematic showing of a modification of the tracklaying mechanism of Fig. 1.
Figure 6:
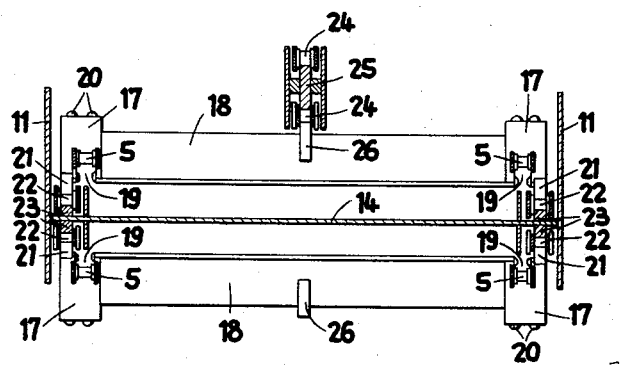
Fig. 6 is a cross-sectional view, on an enlarged scale, taken along the line VI—VI in Fig. 5.

It has been found that the hold-down rails 15 are subject to relatively severe wear and that they produce considerable friction in contact with the track chains. To eliminate these drawbacks, use may be made of the modification illustrated in Figs. 5 and 6, in which the track chains are adapted to be held down preferably by movable hold-down chains 24 resembling the bearing chains 22 and arranged to roll between a suitably shaped supporting member 25 connected with the frame of the associated track chain assembly and supporting plates 26 mounted centrally on the T-sections 18 of the cleats.

However, in order to obviate the drawbacks of the hold-down rails 15 or to dispense with the hold-down chains 24, the skids of the track chain assemblies may be given a shape such that the upper reach of each track chain follows a rectilinear path. With such an arrangement the upper reach of each track chain may run on any suitable supporting member having a rectilinear, e. g. horizontal, guide means for the associated track chain.

For the purpose of operating the hereinbefore mentioned linkages of the steering mechanism for the crawler undercarriage connecting the track chain brakes and the steerable front wheel axles of the vehicle it may be preferable to bolt to the outer extremities of the front wheel stub axles the inner races of ball bearings, the arrangement being such that the steering movements of the front wheel stub axles are transmitted to the said track chain brakes through forked members connected with the outer races of the said ball bearings. This arrangement is of particular advantage in four-wheel drive vehicles in that it prevents friction and wear of the rotating front wheel stub axles.

The crawler-type undercarriage of the invention may also be applied to motorcycles, in which case the track chains will be preferably driven in a suitable manner by means of a differential gearing interposed between the motorcycle engine and the track chains. It will also be preferable in this case to provide for the two track chains to be rockable about a horiozntal axis so that the track chains can easily accommodate terrain irregularities.

From this description it will be readily observed that numerous variations and modifications may be made in a device incorporating the principles of the present invention without departing from the spirit and scope thereof. Therefore, it is intended to cover all such modifications and variations as fall within the true spirit and scope of the novel concepts and principles of the invention.

I claim:

1. A crawler-type tracklaying undercarriage for an automotive vehicle having a drive axle, said undercarriage being adapted to be substituted for the travelling wheels of the vehicle and comprising two structurally independent track chain assemblies, each of said assemblies comprising a unitary skid member, and brackets adapted to connect said skid member with the vehicle and serving to support the vehicle from the ground, the track chain of each track chain assembly extending about its skid member and being guided thereon, the said track chains being guided for movement below the axle of the vehicle, means supporting said skid members on the vehicle so that the skid members are rockable about the driving axle of the vehicle, the ground contact area of said skid members being greater than 60% of the area covered by the vehicle when fitted with its normal traveling wheels.

2. An undercarriage as defined in claim 1 characterized in that the said two track chain assemblies extend at least over the entire length of the vehicle.

3. An undercarriage as defined in claim 1, characterized in that the said two skid members comprise longitudinally extending self-sustaining plate members which are spaced apart and braced by transverse members.

4. An undercarriage as defined in claim 3, characterized in that the said self-sustaining skid members each comprise a drive section, a chain return section and an exchangeable centre section, the length of said centre section substantially corresponding to the wheelbase of the vehicle.

5. An undercarriage as defined in claim 1, comprising supporting rollers of the two driving chains of the track chain assemblies, said rollers being adapted to run on guide rails attached to the skid surfaces intermediate width of the track chain assemblies.

6. An undercarriage as defined in claim 1, characterized in that each of the two track chain assemblies is adapted to be driven by a chain-and-sprocket drive mechanism and that one sprocket of each such mechanism is connected with the vehicle drive axle to be driven thereby.

7. An undercarriage as defined in claim 1, characterized in that there is associated with each track chain assembly a braking device secured the respective track chain assembly and adapted to be operably connected through a brake linkage with the steering mechanism of the vehicle.

8. An undercarriage as defined in claim 7, characterized in that each braking device comprises at least one drum-type brake mounted on the front track chain return shaft, the operating lever of the said brake being connected with the associated steerable wheel hubs of the vehicle by means of linkage supported by the said track chain assembly.

9. An undercarriage as defined in claim 1, comprising individual track chain cleats, longitudinal skid members which are supported on rollers belonging to at least one roller chain and carried by said cleats, which roller chains travel at half the rate of the track chains and are arranged between the respective track chain and its associated guide rail in such a manner that the rollers of the said roller chain are in turn supported by the guide rails mounted on the track chain frame structure.

10. An undercarriage as defined in claim 9, characterized in that the rollers of the supporting roller chain are adapted and arranged exclusively to roll and travel along guide and supporting rails.

References Cited in the file of this patent

UNITED STATES PATENTS

| | | |
|---|---|---|
| 138,707 | Stith | May 6, 1873 |
| 396,862 | Drew | Jan. 29, 1889 |
| 674,737 | Lombard | May 21, 1901 |
| 1,227,005 | Search | May 22, 1917 |
| 1,319,120 | Schutz | Oct. 21, 1919 |
| 1,512,152 | White | Oct. 21, 1924 |